United States Patent [19]
Takakura et al.

[11] 3,868,879
[45] Mar. 4, 1975

[54] OSCILLATING FLYING SHEAR
[75] Inventors: Yoshio Takakura; Yukio Otake; Yukiyoshi Imai, all of Hitachi, Japan
[73] Assignee: Hitachi, Ltd., Tokyo, Japan
[22] Filed: Nov. 3, 1972
[21] Appl. No.: 303,471

[52] U.S. Cl. ............................................. 83/316
[51] Int. Cl. ..................................... B23d 25/06
[58] Field of Search ............. 83/316, 317, 315, 314

[56] References Cited
UNITED STATES PATENTS
871,532  11/1907  Stanton ................................ 83/314
2,436,572  2/1948  Henschker ....................... 83/316 X
2,534,977  12/1950  Kling ................................. 83/315 X
3,528,329  9/1970  Chartet ............................. 83/315 X Primary Examiner—J. M. Meister
Attorney, Agent, or Firm—Craig & Antonelli

[57] ABSTRACT

An oscillating flying shear so constructed that a fluctuating load caused by an oscillating mechanism is offset by a balancing force having a predetermined direction and a predetermined point of application, whereby the shearing speed can be increased to about 200 m/min from about 120 m/min which has heretofore been the highest shearing speed.

8 Claims, 9 Drawing Figures

OSCILLATING FLYING SHEAR

This invention relates to an oscillating flying shear and more specifically, to means for balancing the inertia force of a shearing frame of the oscillating flying shear.

An oscillating flying shear is used for shearing a continuously fed strip material into a predetermined length while said strip material is running. In the shearing operation, the speed of a cutting element is synchronized with the running speed of the strip material to be cut, so as to minimize an error in the sheared length and obtain a satisfactory sheared surface. Therefore, a shearing frame built with a strength large enough to withstand the shearing force makes a reciprocal motion and as a result, fluctuating load (inertia force) occurs. This inertia force varies from positive to negative side or vice versa, and the size thereof increases in proportion to a square number of the line speed as well be discussed later, so that with the operational speed of the associated machine increasing, it accelerates or decelerates the shear and its driving unit, and impairs the smooth reciprocal motion of the shearing frame. Furthermore, this inertia force causes an increasing rattling of bearings, shortened useful lives of said bearings and an increasing gap between the shearing edges, all of which induce an unsatisfactory result of shearing.

For the foregoing reason, it is difficult to increase the operational speed of oscillating flying shears and it is generally believed that a speed of about 120 m/min is the highest limit of speed. Therefore, in incorporating a shearing system in a high speed line as seen for example, in a plating facility, which operates at a speed as high as 120 to 180 m/min, it has been conventional to reduce the line speed to a level not exceeding the shearing speed of the shearing system or alternatively to provide the shearing system separately from the line and performing shearing by the shearing system after a material to be cut has once been taken up on a coiler.

It is, therefore, the object of the present invention to provide means for offsetting the fluctuating load, caused by the reciprocal motion of the shearing frame by a counter-balancing force.

According to one aspect of the invention, it has been confirmed theoretically that the inertia force and inertia torque in a horizontal direction, occurring from the reciprocal oscillatory motion of the shearing frame, are in the same phase and vary in the shape of the sine wave and that the sizes of said inertia force and inertia torque increase in inverse proportion to the sheared length and in proportion to a square number of the line speed, and based on these theoretical facts, the following two conditions have been obtained which must be satisfied by the balancing force:

1. The balancing force must be a righting moment which is proportional to the stroke of the shearing frame and always directed toward the center of the stroke, and the size of which is adjustable relative to the line speed and sheared length.
2. The balancing force must have its point of application at a location spaced a distance obtained by (inertia torque/inertia force) above the center of gravity of the shearing frame.

Namely, according to the invention a fluctuating load occurring incident to the reciprocal oscillatory motion of the shearing frame is offset by applying to said shearing frame a balancing force which satisfies the two conditions set forth above.

According to another aspect of the invention, it is proposed to use the following two devices as balancing force generating means:

a. A pneumatic spring type balancing device, i.e., a device utilizing the restoration force of a pneumatic spring, occurring due to pneumatic pressure change.

b. A rotary balancing device, i.e., a device utilizing the restoration force resorting to the centrifugal force created in a high speed rotary body.

Figure 9:
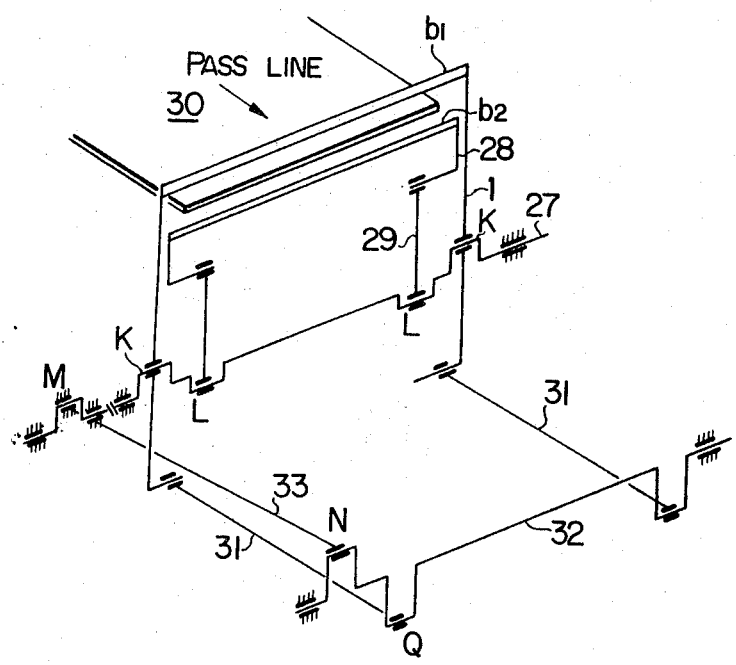
FIG. 9 is a perspective view showing schematically an example of an oscillating flying shear driving system.

First of all, a description will be given on FIG. 9 which shows schematically an example of oscillating flying shear.

A crank shaft 27 driven by a driving power source has eccentric portions K, L which are 180° different in phase from each other. To the eccentric portions K is connected a gate shearing frame 1 having an upper cutter $b_1$ fixed thereto, while to the eccentric portions L is connected a linkage 28, 29 having a lower cutter $b_2$ fixed thereto. Such being the construction, the lower cutter $b_2$ makes a vertical movement incident to oscillatory movement of the upper cutter $b_1$, while sliding within the shearing frame 1, and shears a material (band strip) 30 beind fed to be cut, at a position where it mates with the upper cutter $b_2$.

A shaft 32 having cranks Q and N is connected to the shearing frame 1 through a link 31. For matching the oscillating speed of the cutter with the feeding speed of the band strip 30 at the shearing moment, a synchronizing device M adapted to adjust the amount of eccentricity is connected to the crank shaft 27 and this synchronizing device M is connected to the crank N by a link 33, whereby the motion of said crank N is transmitted to the shearing frame 1 through the crank Q and link 31.

Figure 1:
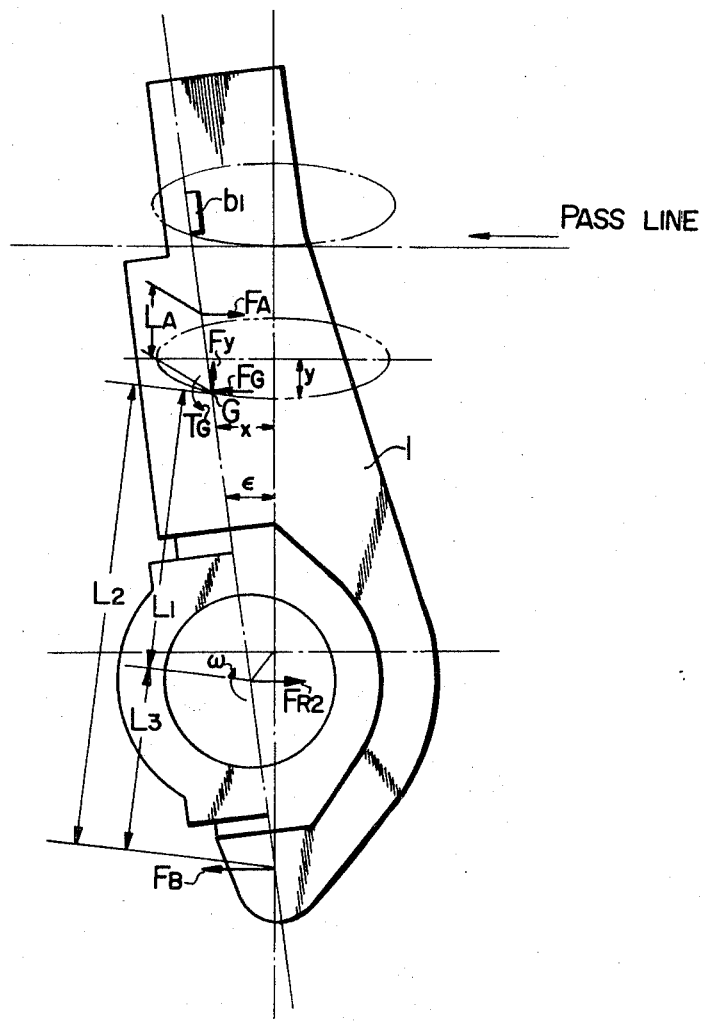
FIG. 1 is an illustrative view showing the relation of forces acting on a shearing frame.

The motion of the shearing frame 1 is illustrated in FIG. 1. The upper cutter point and the center of gravity respectively make motions along the loci indicated by the alternate long and short dash line and alternative long and two short dashes line in FIG. 1. Now, with $x$ and $y$ respectively representing orthogonal coordinates in horizontal and vertical directions and with $\epsilon$ representing the angle of inclination of the shearing frame 1, the motion of the center of gravity is approximately expressed by the following formulae:

$$\left.\begin{array}{l} x = x_0 \sin \text{wt} \\ y = -y_0 \cos \text{wt} \\ \epsilon = \epsilon_0 \sin \text{wt} \end{array}\right\} \quad (1)$$

wherein $x_0$, $y_0$ and $\epsilon_0$ stand for the maximum amplitudes thereof respectively by, $\epsilon_0$ being proportional to $x_0$ and $x_0$ being proportional to the sheared length L and further, $y_0$ being constant irrespective of the sheared length.

The degrees of approximation of $x$ and $\epsilon$ are high and errors thereof are smaller than 2 – 3%. The degree of approximation of $y$ is not high, but the influence of the vertical motion is small and an error of $y$ is negligible. Therefore, with M representing the mass of the shearing frame and I representing the moment of inertia, the inertia forces $F_G$ and $F_y$ in horizontal and vertical directions and the inertia torque $T_G$, at the center of gravity G are expressed by the following formulae:

$$\left.\begin{array}{l} F_G = -M\ddot{x} = \omega^2 M x \\ F_y = -M\ddot{y} = \omega^2 M y \\ T_G = -I\ddot{\epsilon} = \omega^2 I \end{array}\right\} \quad (2)$$

Forces $F_B$, $F_{R2}$ balancing with these inertia forces $F_G$, $F_y$ and the inertia torque $T_G$ are transmitted to the driving mechanism to cause the above-described objectional phenomenon. With $L_1$, $L_2$ representing the distances from the center of gravity G to the points $R_2$, B respectively, the sizes of the forces $F_B$, $F_{R2}$ are expressed by the following formulae:

$$\left.\begin{array}{l} F_B = (F_G \cdot L_1 \cos\epsilon - F_y \cdot L_1 \sin\epsilon + T_G/L_3 \cdot \cos\epsilon) \\ \quad = (F_G \cdot L_1 + T_G/L_3) \\ F_{R2} = F_G + F_B \\ \text{wherein } L_3 = L_2 - L_1. \end{array}\right\} \quad (3)$$

The inertia force $F_y$ in the vertical direction is transmitted to the main shaft of the shear but is smaller than the force $F_{R2}$ and is about 10% of the latter. Therefore, balancing the inertia force $F_G$ in the horizontal direction with the inertia torque $T_G$ will be considered hereunder.

Now, when the forces $F_B$, $F_{R2}$ transmitted to the driving mechanism are calculated, with a balancing force $F_A$ applied to the upper portion of the shearing frame (to a point A a distance $L_A$ spaced from the center of gravity G), $$\left.\begin{array}{l} F_B = (F_G \cdot L_1 \cos\epsilon - F_y \cdot L_1 \sin\epsilon + T_G - F_A(L_1 + L_A) \cdot \cos\epsilon/L_3 \cdot \cos\epsilon, \\ \quad \approx (F_G \cdot L_1 + T_G - F_A(L_1 + L_A))/L_3 \\ F_{R2} = F_G + F_B - F_A \end{array}\right\} \quad (4)$$

When the balancing force $F_A$ is balanced completely with the inertia torque $T_G$, the result is $F_B = F_{R2} = 0$. To this end, the following conditions must be satisfied:

$$\left.\begin{array}{l} F_A = F_G = \omega^2 M x \\ L_A = (T_G/F_G) = (I\epsilon_0/M x_0) \end{array}\right\} \quad (5)$$

Now, the maximum value of the inertia force $F_G$ will be considered. With Ns representing the rate of rotation of the shear main shaft, V the running speed of the material (the line speed) and L the sheared length, it is stated that $x_0 \alpha L$ as a result of the synchronization of speed as described above and $x_0 \alpha \epsilon_0$ due to the motion of the shearing frame, and $$\omega = (Ns/2\pi) = (1/2\pi) \cdot (V/L) \quad (6)$$

After all, the maximum value of the inertia force $F_G$ is given by the following formula:

$$\text{Max } F_G \alpha M \cdot (V^2/L) \quad (7)$$

Namely, the maximum value of the inertia force is in proportional to a square of the line speed and in inverse proportion to the sheared length. Further, the point of application $L_A$ is fixed because $\epsilon_0$ is proportional with $x_0$ and need not be changed even if the sheared length L changes. Thus, it will be understood that, by applying the force $F_A$ equal to the inertia force $F_G$ to the point $L_A$, the forces acting on the shearing frame will be completely balanced therein and no fluctuating load will be transmitted to the driving mechanism.

It will be understood from the foregoing that the balancing force must satisfy the following conditions:

1. The balancing force is a righting force which is proportional to the stroke of the shearing frame and directed constantly toward the center of the stroke, and the maximum value thereof varies in proportion to $V^2/L$ as will be seen from the equation (7) given above.

2. The point of application of the balancing force is steady and is a position a distance $L_A = T_G/F_G = I\epsilon_0/M x_0$ spaced above the center of gravity.

The conditions set forth above are for the optimum value of the balancing force and the balancing force actually applied to obtain the intended result may slightly deviate from the above conditions. Namely, in the condition (1) the balancing force need not be in exact proportion to the stroke of the shearing frame but may be within a certain allowable range, and the influence of an error between the value of a balancing force selected within such allowable range and the optimum value given by the formula depicted above is practically negligible. Furthermore, the size of the balancing force need not be changed in exact accordance with the value of $V^2/L$ but may be changed stepwise within a practically allowable range. In addition, in the condition (2), while the position the distance $L_A = T_G/F_G$ spaced above the center of gravity is the point most desirable for the balancing force to be applied, in practice a slight deviation of the point of application from the aforesaid position due to mechanical restrictions is permissible to obtain the intended result. Should it be impossible to locate the point of application at the position specified above by reason of limitations on design, a plurality of forces respectively having different points of application can be applied such that the point of application of the resultant force thereof may be located at the position $L_A$.

Hereunder, a flying shear comprising pneumatic balancing devices, in which the present invention is embodied, will be described with reference to FIGS. 2 and 3.

Figure 2:
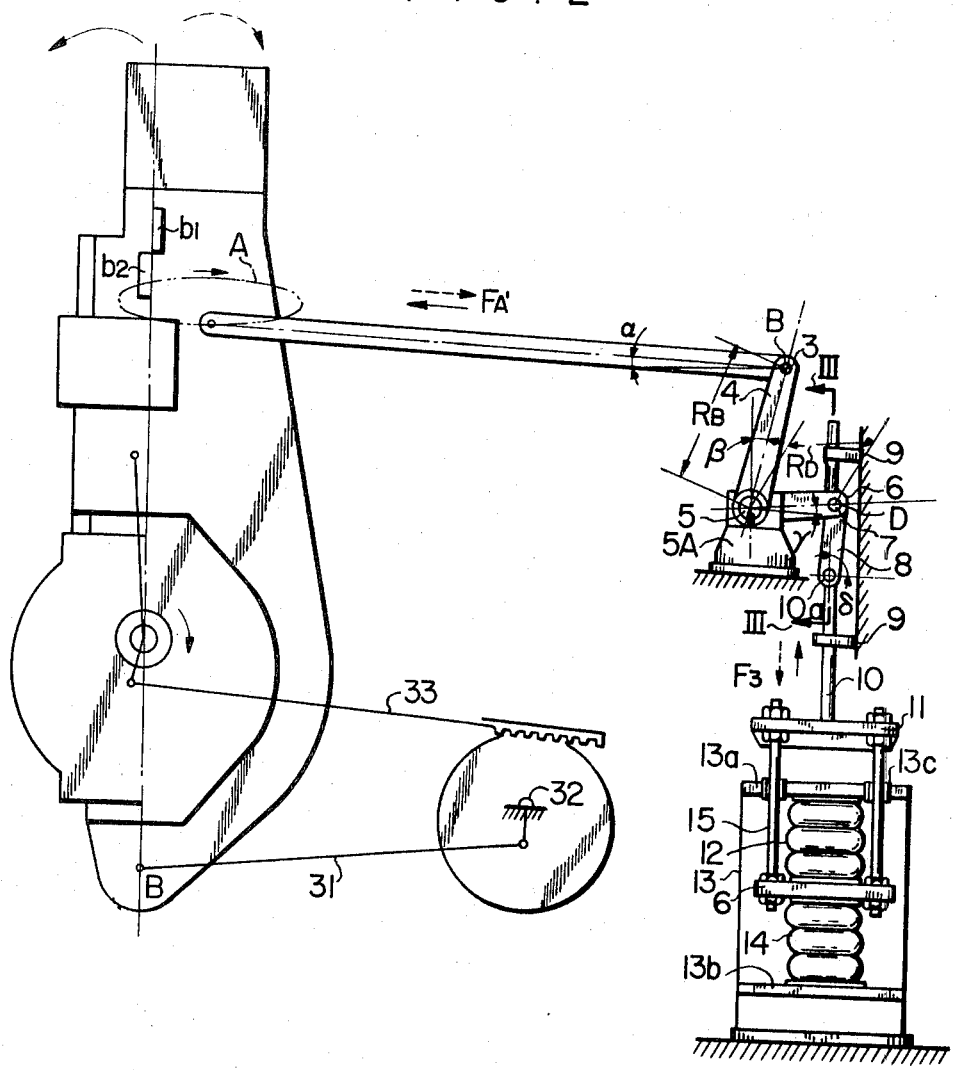
FIG. 2 is an entire view of an embodiment of the oscillating flying shear to which the present invention is applied.
Figure 3:
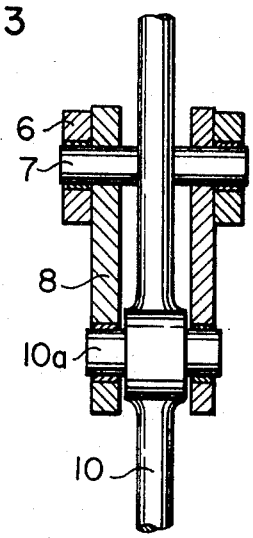
FIG. 3 is a sectional view taken along the line III—III of FIG. 2.

In FIGS. 2 and 3, a shearing frame 1 has one ends of links 2 connected to the opposite side arms thereof. The other end of each link 2 is connected through a pivot pin 3 to one end of a lever 4 which is keyed to a shaft 5. The shaft 5 is rotatably supported on a bracket 5A. A lever 6 has one end keyed to the shaft 5 and the other end thereof is connected through a pivot pin 7 to one end of a lever 8. The other end of the lever 8 is pivoted to a trunnion 10a at the upper end of a guide rod 10 which is axially movably supported by a support member 9.

To the lower end of the guide rod 10 is fixed an arm 11 extending at right angles to said guide rod. The arm 11 has the upper ends of connecting rods 15 connected thereto and the lower ends of said connecting rods 15 have a separation plate 16 fixed thereto through nuts. The connecting rods 15 slidably extend through bushes 13C provided in an upper plate 13a of a support stand 13. Between the upper plate 13a of the support stand 13 and the separation plate 16 is disposed a pneumatic spring unit 14.

In FIG. 2, the flying shear shown is in a position in which an upper cutter mount is lowered and a lower cutter mount is elevated, by a known oscillating mechanism, with an upper cutter $b_1$ and a lower cutter $b_2$ being in engagement with each other, i.e., the flying shear is in its shearing position. As a crank shaft rotates further from this position in the direction of the arrow, the point of connection A between the shearing frame 1 and the link 2 moves while drawing an elliptical orbit indicated by the alternate long and two short dashes line. This movement causes the guide rod 10 to move upward, through the links 2, the levers 4, 6 and 8. As a result, one of a pneumatic spring unit 12 and the pneumatic spring unit 14 is compressed and the other one of them is expanded, and thus the pneumatic spring units simultaneously make reverse movements with the same stroke. In the arrangement shown in FIG. 2, the lever 4 is inclined at an angle of $\beta$, so as to equalize the strokes of expansion and compression of the penumatic spring units 12, 14.

Figure 4:
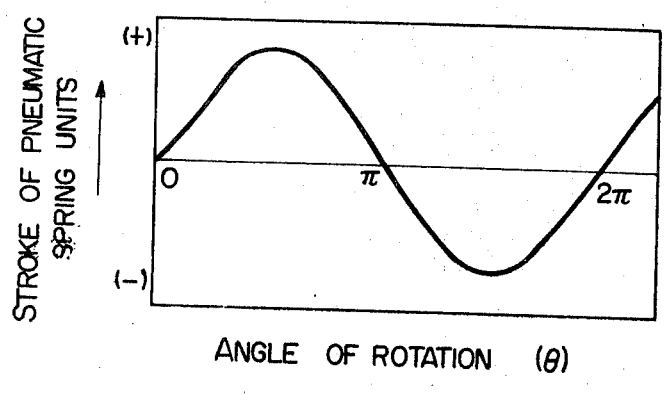
FIG. 4 is a diagram graphically showing the relationship between the stroke of a pneumatic spring and the rotational angle of a crank shaft, or a pneumatic spring type balancing device which is an example of the balancing force generating device used in the present invention.

FIG. 4 shows graphically the displacement of the trunnion 10a of the lever 8, i.e., the stroke of the pneumatic spring units. As seen, the stroke of the pneumatic spring units relative to the angle of rotation O of the crank of the shearing frame 1 is substantially in the shape of sine wave.

Figure 5:
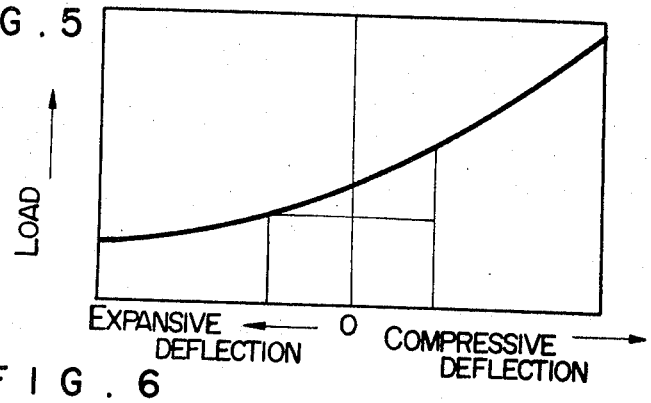
FIG. 5 is a diagram graphically showing the characteristic of the pneumatic spring.
Figure 6:
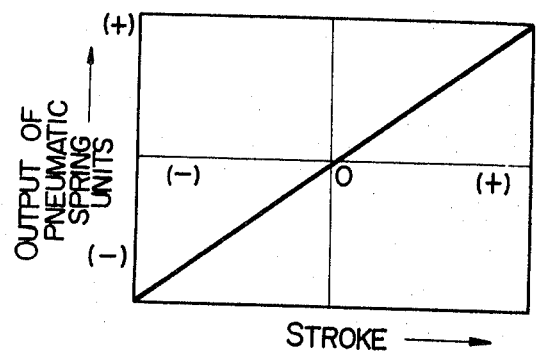
FIG. 6 is a diagram graphically showing the output relative to the stroke of a set of pneumatic springs used in the present invention.
Figure 7:
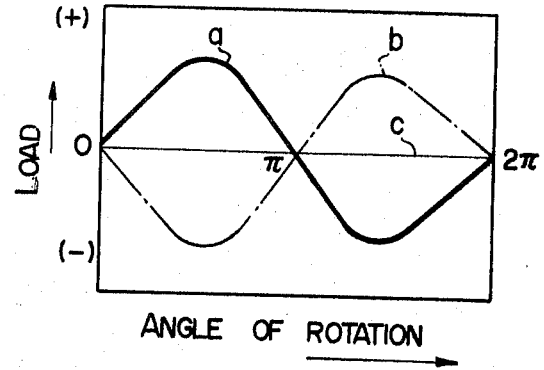
FIG. 7 is a diagram graphically showing a fluctuating load and a balancing force.

FIG. 5 shows the characteristic of each individual pneumatic spring unit 12 or 14. In the graph of FIG. 5, the axis of abscissa is scaled by expansive deflection and compressive deflection and the axis of ordinate by load. FIG. 6 shows the stroke and output of a set of upper and lower pneumatic spring units arranged as shown in FIG. 2, when one of them is expanded and the other one is compressed. As seen, the stroke and output are substantially in a proportional relation. As may be understood from FIGS. 4 and 6, the output of the set of upper and lower pneumatic spring units varies in the shape of a sine wave as indicated by the alternate long and two short dashes line $b$ in FIG. 7, and balanced balanced with a fluctuating load or inertia force $a$ indicated by the solid line in FIG. 7, so that no fluctuating load is transmitted to the driving mechanism. The size of this balancing force is adjusted by varying the air pressure sealed in the pneumatic spring units.

Figure 8:
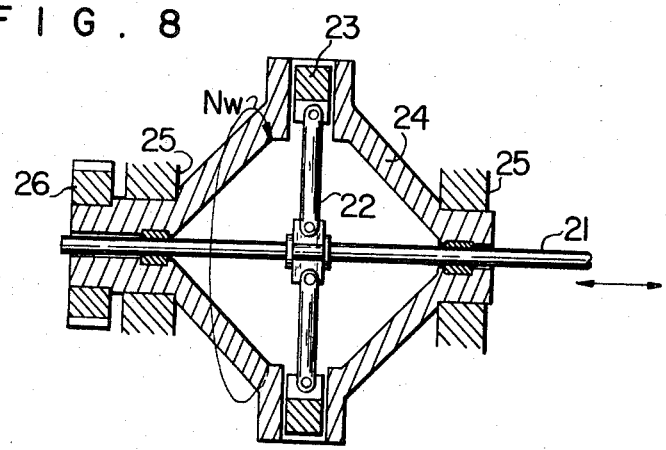
FIG. 8 is a view showing a rotary balancing device which is another example of the balancing force generating device used in the present invention.

The present invention may be practiced in the other form. Namely, according to another embodiment of the invention, the oscillating flying shear may comprise a rotary balancing device as shown in FIG. 8, in lieu of the pneumatic balancing device described above. In FIG. 8, a rod 21 is connected to the upper portion of the shearing frame (not shown) through a linkage (the links 2–7 in FIG. 2), similar to the pneumatic balancing device. Inertial masses 23 are respectively connected to the rod 21 by links 22 for sliding movement within a rotor 24. The rotor 24 is supported by bearings 25 and driven externally through a gear 26 at a rate of $N_W$. When the rod 21 makes a reciprocal movement in the axial direction incident to the movement of the shearing frame, the inertial masses 23 also make a reciprocal movement inwardly and outwardly of the rotor 24 in sliding engagement with said rotor. In this case, since the rotor 24 is rotating at the rate of $N_W$, a centrifugal force is increased in each inertial mass, whih imparts a righting force to the associated link 22 which tends to hold said link in a position perpendicular to the rod 21. The output $F_W$ of the rod 21 resulting from this righting force is expressed by the following formula:

$$F_W = Mb(2\pi^N W/60)^2 xs$$

wherein $Mb$ is the total mass of the inertial masses and $xs$ is the stroke of the rod 21.

Therefore, it will be understood that this force $F_W$ is also proportional to the stroke, similar to the case of the pneumatic balancing device shown in FIG. 2 and hence satisfies the requirements for balancing force. The size of this force is varied by varying the rate of rotation $N_W$ of the rotor.

According to the present invention, it is possible to minimize the fluctuating load (inertia force and inertia torque) which becomes a problem in increasing the operational speed of an oscillating flying shear and thereby to increase the associated line speed from about 120 m/min which has heretofore been regarded as the highest limit, to about 200 m/min, without changing the other equipments of the production line. Therefore, the oscillating flying shear of the invention is a great contribution to the productivity, that is, the production efficiency, of the entire production line. It is also to be noted that even when the demand for increasing invention speed is not so strong, practicing the present invention is advantageous in obtaining a smooth oscillatory motion of a shear with minimum shocks and noises and accordingly, in extending the useful life of the shear proper.

What is claimed is:

1. An oscillating flying shear comprising a shearing frame making an oscillatory motion in synchronism with the speed of a material being fed to be cut, a pair of cutters operated to be engaged with and disengaged from each other within said shearing frame, a mechanism for operating said shearing frame and said cutters, and means for applying to said shearing frame a righting force means for connecting said righting force means with said shearing frame, said connecting means being provided on said shearing frame at a predetermined distance from the center of gravity thereof toward said cutters, said predetermined distance being substantially equal to the distance computed in accordance with the equation:

$$L_A = (I\epsilon_o/Mx_o),$$

where:

$L_A$ = said predetermined distance,
$I$ = moment of inertia,
$\epsilon_o$ = maximum angle of inclination of said shearing frame,
$M$ = mass of said shearing frame,
$x_o$ = maximum amplitude of the shearing frame in the horizontal direction, said righting force having a size proportional to the stroke of the shearing frame and is constantly directed toward the center of said stroke.

2. An oscillating flying shear comprising a shearing frame making an oscillatory motion in synchronism with the speed of a material being fed to be cut, a pair of cutters operated to be engaged with and disengaged from each other within said shearing frame, a mechanism for operating said shearing frame and said cutters, and means for applying to said shearing frame a righting force means for connecting said righting force means with said shearing frame, said connecting means being provided on said shearing frame at a predetermined distance from the center of gravity thereof toward said cutters and, said predetermined distance being substantially equal to the distance computed in accordance with the equation:

$$L_A = (I \epsilon_0 / M x_0)$$

where:
 $L_A$ = said predetermined distance,
 $I$ = moment of inertia,
 $\epsilon_0$ = maximum angle of inclination of said shearing frame,
 $M$ = mass of said shearing frame,
 $x_0$ = maximum amplitude of the shearing frame in the horizontal direction, said righting force having a size proportional to the stroke of the shearing frame and predetermined by the line speed and sheared length and is constantly directed toward the center of said stroke.

3. An oscillating flying shear comprising a shearing frame making an oscillatory motion in synchronism with the speed of a material being fed to be cut, a pair of cutters operated to be engaged with and disengaged from each other within said shearing frame, a mechanism for operating said shearing frame and said cutters, and means for applying to the shearing frame a righting force means for connecting said righting force means with said shearing frame, said connecting means being provided on said shearing frame at a predetermined distance from the center of gravity thereof toward said cutters, said predetermined distance being substantially equal to the distance computed in accordance with the equation:

$$L_A = (I \epsilon_0 / M x_0)$$

where:
 $L_A$ = said predetermined distance,
 $I$ = moment of inertia,
 $\epsilon_0$ = maximum angle of inclination of said shearing frame,
 $M$ = mass of said shearing frame,
 $x_0$ = maximum amplitude of the shearing frame in the horizontal direction, said righting force having a size proportional to the stroke of the shearing frame and is constantly directed toward the center of said stroke, said righting force being the resultant force of a plurality of component forces respectively having different points of application on said shearing frame 4. An oscillating flying shear comprising a shearing frame making an oscillatory motion in synchronism with the speed of a material being fed to be cut, a pair of cutters operated to be engaged with and disengaged from each other within said shearing frame, a mechanism for operating said shearing frame and said cutters, a rotor arranged exteriorly of said shearing frame and rotating at a predetermined rate, inertial masses provided in the interior of said rotor and operated to bring a rod extending through said rotor to its neutral position by a centrifugal force created therein, and a mechanism for connecting said rod and said shearing frame with each other.

5. An oscillating flying shear arrangement comprising: a shearing frame means mounted for oscillatory motion; cutter means disposed on said shearing frame means; means for imparting oscillatory motion to said shearing frame means; a reciprocably mounted member operatively connected with said shearing frame means and reciprocated in response to the oscillatory movement thereof; and means for applying a righting force to said shearing frame means including a rotor means, means for driving said rotor means at a predetermined rate, and means disposed within said rotor means and operatively connected with said member for counteracting the reciprocable movement of said member whereby a righting force is applied to said shearing means.

6. An arrangement according to claim 5, wherein said righting force is applied to said shearing frame at a predetermined distance from the center of gravity thereof, said predetermined distance being substantially equal to the distance computed in accordance with the equation:

$$L_A = (I \epsilon_0 / M x_0)$$

where:
 $L_A$ = said predetermined distance,
 $I$ = moment of inertia,
 $\epsilon_0$ = maximum angle of inclination of said shearing frame,
 $M$ = mass of said shearing frame,
 $x_0$ = maximum amplitude of the shearing frame in the horizontal direction.

7. An oscillating flying shear according to claim 1, wherein said means for applying a righting force includes a pair of pneumatic spring means arranged symmetrical to each other and always operating toward their neutral position, means for joining said pneumatic spring means, and means connected to said joining means for connecting the same with said shearing frame whereby said righting force is applied to said shearing frame.

8. An oscillating flying shear according to claim 1, wherein said means for applying a righting force includes a rotor arranged exteriorly of said shearing frame and rotating at a predetermined rate, inertia masses provided in the interior of said rotor operated to bring a rod extending through said rotor to its neutral position by a centrifugal force created therein, and means for connecting the rod with said shearing frame.

* * * * *